United States Patent
Cannon et al.

(10) Patent No.: US 9,680,561 B2
(45) Date of Patent: Jun. 13, 2017

(54) SITUATIONAL AWARENESS AND POSITION INFORMATION FOR SATELLITE COMMUNICATION TERMINALS

(71) Applicant: The United States of America as represented by the Secretary of the Navy, Washington, DC (US)

(72) Inventors: Corey Cannon, Bloomington, IN (US); Andrew Martin, Ellettsville, IN (US); Brian Brackee, Bloomington, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/015,354

(22) Filed: Feb. 4, 2016

(65) Prior Publication Data

US 2017/0093481 A1 Mar. 30, 2017

Related U.S. Application Data

(60) Provisional application No. 62/235,562, filed on Sep. 30, 2015, provisional application No. 62/269,318, filed on Dec. 18, 2015.

(51) Int. Cl.
*H04B 7/185* (2006.01)
*H04W 4/22* (2009.01)
*H04W 4/18* (2009.01)

(52) U.S. Cl.
CPC ........ *H04B 7/18513* (2013.01); *H04W 4/185* (2013.01); *H04W 4/22* (2013.01)

(58) Field of Classification Search
CPC .............. H04B 7/1851; H04B 7/18513; H04B 7/18515; H04B 7/18517; H04B 7/18519;
(Continued)

(56) References Cited

U.S. PATENT DOCUMENTS

| 7,904,082 B2 | 3/2011 | Graves et al. |
| 2011/0165905 A1* | 7/2011 | Shuman .................. H04W 4/02 455/518 |
| 2012/0243465 A1* | 9/2012 | Wohlford ............ H04W 76/025 370/316 |

OTHER PUBLICATIONS

Iridium SBD Service—Brochure—English, Jan. 19, 2014; https://www.iridium.com/services/iridium-sbd; 4 pages.
(Continued)

*Primary Examiner* — Philip Sobutka
(74) *Attorney, Agent, or Firm* — Christopher A. Monsey

(57) ABSTRACT

An efficient and reliable way to send various information including position location information (PLI) and emergency messages (EM) using or within a mobile satellite system (MSS) using different message formats including short message (e.g., short burst data (SBD), etc.), between mobile users as provided. Embodiments also use global positioning systems (GPS) used in some cases with the PLI system. Various embodiments improve communications efficiency and reliability of message transmission through various types of MSS. Embodiments include a method or approach to interface SBD PLI messages from mobile end user terminals (EUT) to common operating picture (COP) application programs as provided. Exemplary methods interface and translate MSS short messages (e.g., SBD) to extensible markup language (XML) message format and communicate converted messages to COP application program within a computer using a TCP/IP interface.

6 Claims, 15 Drawing Sheets

(58) Field of Classification Search
CPC ............ H04B 7/18521; H04B 7/18523; H04B 7/18526; H04B 7/18528; H04B 7/18553; H04B 7/18532; H04B 7/18534; H04B 7/18536; H04B 7/18539; H04B 7/18541; H04B 7/18543; H04B 7/185; H04B 7/18545; H04B 7/18547; H04B 7/18556; H04W 4/00; H04W 4/02; H04W 4/021; H04W 4/022; H04W 4/023; H04W 4/025; H04W 4/026; H04W 4/027; H04W 4/028; H04W 4/04; H04W 4/043; H04W 4/046; H04W 64/00; H04W 64/003; H04W 64/006
USPC .......... 455/456.1–456.6, 457, 427, 428, 429, 455/430, 12.1, 13.1, 13.2, 13.3, 13.4, 518, 455/519, 520
See application file for complete search history.

(56) References Cited

OTHER PUBLICATIONS

"Implementation Manual for Iridium Satellite Communications Service" v. 1.0, Feb. 15, 2006; http://www.icao.int/safety/acp/Inactive%20working%20groups%20library/ACP-WG-M-IRIDIUM-3/IRD-SWG03-WP06-IRIDIUM%20Implementation%20Manual%20021506.pdf; 59 pages.

Iridium Communications—Wikipedia; https://en.wikipedia.org/wiki/Iridium_Communications; 14 pages, retreived Dec. 29, 2016.

Iridium SMS and SBD; http://www.skyhelp.net/acrobat/Iridium%20SBD-FAQ%201-05.pdf; 3 pages, Jan. 2005.

PECOS—Message Definition Specification—Final; Contract: PECOS Task Order:011, Document No. 200907-001, Version 1.7, Jul. 29, 2009; prepared by: L3 Intelligence Solutions, a Division of L-3 Communications; 37 pages.

* cited by examiner

251 —— //string pecostext=
"0001110FAD9AF744FC790000014E30D2A4E00000000000402CCCCD404372D89557EB79C055B9D32B203F3B4347FF3B4396F4463E23D7"

253 —— Fields:

| Field | Type |
|---|---|
| Time (UTC) | Integer |
| Brevity Code | Float |
| Position Dilution of Precision (PDOP) | Double |
| Latitude (Decimal Degrees) | Double |
| Longitude (Decimal Degrees) | Float |
| Altitude (meters) | Float |
| Course (Degrees True) | Float |
| Ground Velocity (knots) | |

```
<?xml version='1.0'
standalone='yes'?>
<!--A waypoint type event -->
<event
type="a-f-G"
uid ="300234011013460"
time ="2015-08-20T13:18:00.0Z"
start="2007-01-27T00:00:00:00Z"
stale="2007-02-15T23:59:59.99Z"
how="m-g"
version="2.0">
<point
lat="38.9537967"
lon="-77.3371303"
hae="117.727"
ce="0"
le="0"/>
<detail>
<track course="0" speed="0.06"
pdop="2.21" brevity="0"/>
</detail>
</event>
```

FIG. 15

| Routine Name | Figure | Description |
|---|---|---|
| Main_Form_Open | Fig. 7 (113) | Initialized MTA Program and Variables |
| NAL_USB_Connect | Fig. 7 (115) Fig. 8 (131) | Initialize Serial Interface and EUT |
| Connect_Button_Click | Fig. 7 (117) Fig. 8 (139) | Connect EUT to MSS |
| SBDI_Send_MSS | Fig. 7 (119) Fig. 9 (151) | Retrieve PLI Messages from MSS PLI Server |
| SBDRT_Send_EUT | Fig. 7 (119) Fig. 9 (157) | Download and Test SBD Messages from EUT |
| Convert_Hex_to_Binary | Fig. 7 (121) Fig. 10 (171) | Convert SBD and Key from Hexadecimal to Binary |
| Decrypt_AES | Fig. 7 (121) Fig. 10 (179) | Decrypt SBD Message |
| Decode_SBD_to_CoT | Fig. 7 (123) Fig. 11 (191) | Translate PECOS SBD PLI Message into CoT XML |
| Send_to_Loopback_Address | Fig. 7 (125) Fig. 12 (211) | Send CoT PLI Message to Loopback Address |

FIG. 16

SITUATIONAL AWARENESS AND POSITION INFORMATION FOR SATELLITE COMMUNICATION TERMINALS

STATEMENT REGARDING FEDERALLY SPONSORED RESEARCH OR DEVELOPMENT

The present application claims priority to U.S. Provisional Patent Application Ser. No. 62/235,562, filed Sep. 30, 2015, entitled "SITUATIONAL AWARENESS AND POSITION LOCATION INFORMATION INTERFACE SYSTEM," and U.S. Provisional Patent Application Ser. No. 62/269,318, filed Dec. 18, 2015, entitled "SITUATIONAL AWARENESS, COMMAND, AND/OR CONTROL SYSTEMS AND RELATED METHODS INCLUDING MULTIPLE COMMUNICATIONS SYSTEMS CONFIGURED WITH SHORT MESSAGING BASED EMBODIMENTS," the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,325) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a position location information (PLI) and mobile team messaging system, e.g. emergency, using mobile satellite system (MSS) short messages (e.g., short burst data (SBD) messages) from end user terminals (EUT) to a command and control (C2) common operating picture (COP), solely within MSS, without using Internet protocols or services over space segment. This enables small groups to communicate between themselves and track each other's locations for situational awareness (SA) without Internet or land-based radios. Short messages, e.g., SBD, can: a) increase reliability and reduce latency compared with Internet connections, b) increase geographical availability, c) reduce complexity, and d) simplify operation.

A variety of systems can be used with or within exemplary embodiments of the invention. For example, a government off-the shelf (GOTS) COP, e.g., RaptorX, application programs, can be used to retrieve PLI and messages using Transmission Control Protocol/Internet Protocol (TCP/IP) from Internet connected PLI/message servers. Mobile COP application programs can be configured to access PLI and messages from Internet connected MSS PLI/message servers, by establishing Internet connections over one or more MSS space based segments. Internet communications over MSS, e.g. Iridium® Satellite Network, are slow and unreliable due to high latency and frequent interruptions when satellites approach horizon. These characteristics adversely interact with TCP/IP error control strategy, further reducing throughput and reliability.

Exemplary MSS's can be configured to provide short message capabilities such as SBD for reliable communications during marginal conditions, and communicate Global Positioning System (GPS) PLI. EUT PLI information can be configured to be accessible within MSS using SBD. SBD messages can be sufficiently long to transmit PLI and emergency messages (EM). Interfacing COP application programs to MSS, without using Internet protocols over MSS space segment(s), provides more reliable operation. Embodiments of the invention can enable portable worldwide tracking SA to mobile COP terminals where MSS reception exists. An exemplary embodiment can provide a single set of hardware and protocols that reduces complexity and simplifies operation, desirable characteristics for operating in remote disaster areas for various applications or needs including humanitarian assistance and disaster relief (HA/DR) operations.

One embodiment employs PLI messages sent from and retrieved by EUT(s) that include a two-way satellite messaging and personal tracking system using a transceiver board, e.g. NAL Research Corporation's Shout Nano hardware, to communicate over a MSS, e.g. Iridium® Satellite Network, using SBD. A computer with COP, e.g. RaptorX, application program can be connected to such an exemplary EUT. Embodiments of the invention can include one or more exemplary message transport agent (MTA) embodiments, e.g. Shout—Receive Translate Send (RTS), computer program(s) or systems that are configured to interface and translate PLI message formats and protocols from EUT formats into a COP application program format. Exemplary MTA(s) can receive PLI and messages from MSS's PLI and message server via SBD and translate/send them to various exemplary COP application program(s). Embodiments of the invention can also eliminate a need for COP application programs to remotely access MSS PLI and message servers using Internet protocols. MTA and COP application programs can also be configured to internally communicate PLI messages using computer network interface loopback address. Exemplary COP application program can quickly and reliably retrieve PLI messages from MSS via MTA, without modifying a COP application program to operate with MSS PLI message formats and interfaces.

Exemplary MTAs can have multiple functions: a) interface an EUT and computer; b) control an EUT; c) decrypt message; d) translate message formats; and e) send translated messages to COP application program. Exemplary MTAs can: a) control computer's serial interface, e.g. universal serial bus (USB); b) control EUT using Hayes modem commands, e.g. "AT"; c) translate MSS's messaging structure, e.g., PECOS messaging structure (PMS), to a COP message format, e.g. GOTS Cursor on Target (CoT) message format; and d) send translated PLI and messages over internal loopback address, e.g., 127.0.0.1, using TCP/IP protocols. In some embodiments, CoT can be used to describe various examples of transmission interoperable MTA output schemas to the COP application program or display with respect to a machine-to-machine (M2M) based messaging schema that can include PLI messaging schema. An exemplary system can include a CoT event data model that can include or define an extensible markup language (XML) data schema for exchanging time sensitive position of moving objects, or "what", "when", and "where" information, between systems. XML is a textual data format widely used for the representation of arbitrary data structures such as those used in world wide web services.

Some embodiments provide short SBD PMS messages that are expanded into CoT XML messages. SBD PMS messages include American Standard Code for Information Interchange (ASCII) text, and binary format data. Such exemplary CoT's XML messages use ASCII or UNICODE (multi-byte encoding, representation, and handling of text expressed in most of the world's writing systems) characters with tags, e.g. metadata, to identify fields. Exemplary PMS messages are brief, and XML messages are larger. Some exemplary PMS messages are optimized for MSS communications, and XML is suitable for Internet communications.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 14 shows an exemplary MTA PECOS PLI message format and fields in hexadecimal string;

FIG. 15 shows an exemplary MTA CoT XML PLI message format; and

FIG. 16 is an exemplary software function call list for an exemplary embodiment of a MTA system.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Capitalization of words preceding an acronym is not intended to limit a meaning of such capitalized words to one embodiment but rather is merely employing a writing convention to capitalize words preceding an acronym.

Figure 1:
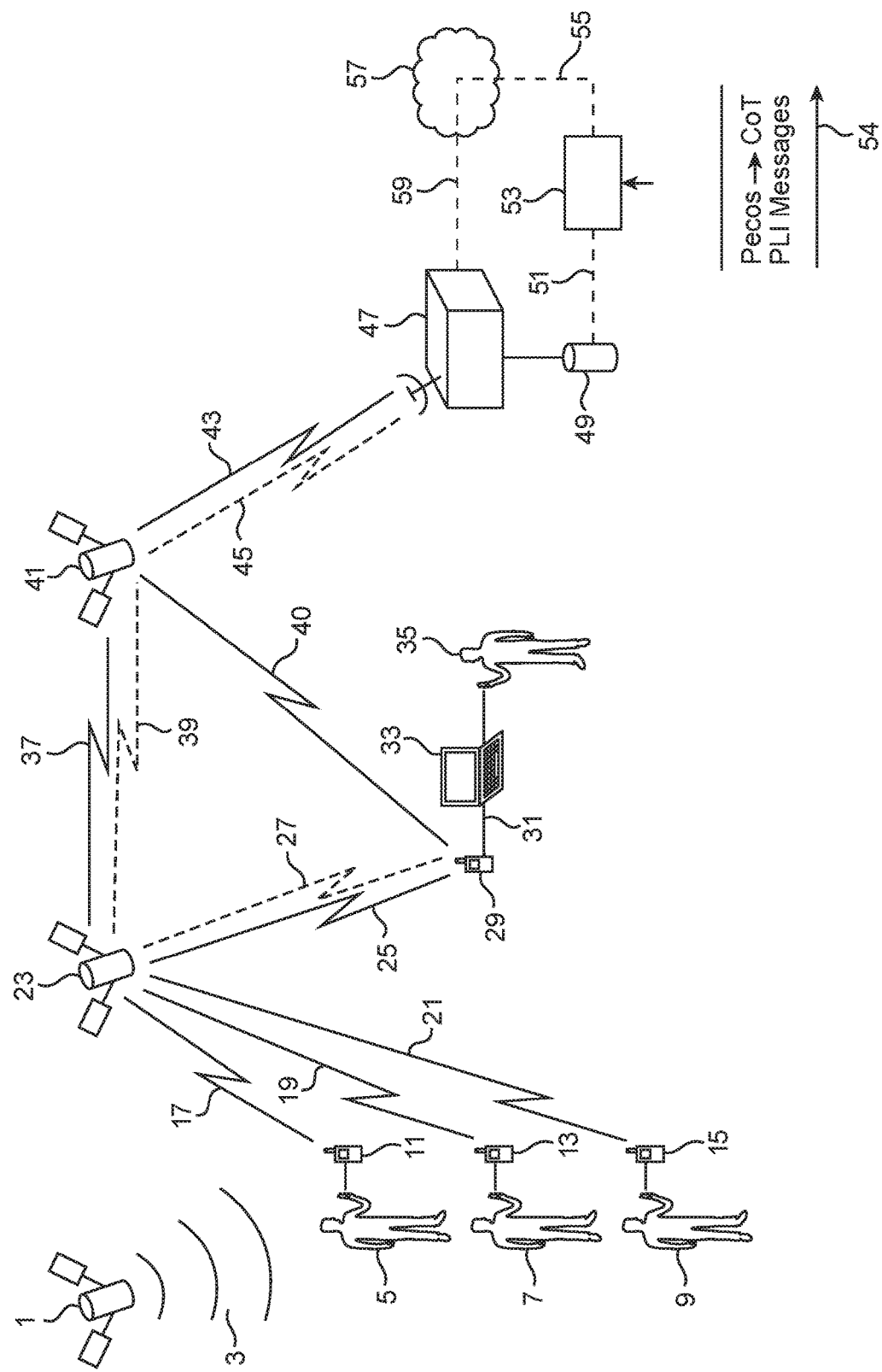
FIG. 1 illustrates a simplified context for an exemplary SA and C2 interface system operating within a MSS to report GPS PLI operating within a MSS to report GPS PLI.

Referring initially to FIG. 1, a simplified exemplary architecture for SA and C2 interface system is provided. It provides both context and environment for the system to operate. Mobile location system (MLS) 1, e.g. GPS, provides geospatial reference signals (GRS) 3 to mobile team(s) 5, 7, 9 with EUT(s) 11, 13, 15 with ability to read GRS 3 to determine their location. EUT(s) 11, 13, 15 communicate EUT PLI via SBD messages 17, 19, 21 to MSS node(s) 23, 41 which are further communicated via a MSS cross link 37 and a MSS-to-gateway downlink 43 to a MSS gateway 47 and stored in PLI server 49. PLI is re-communicated to mobile team leader 35 via two paths: SBD 43, 37, 25 and TCP/IP protocol 51, 55, 57, 59, 45, 39, 27 via MSS gateway 47 through MSS node(s) 41, 23 to EUT 29 via serial interface (SI) 31 to portable computer 33 which displays various COPs (e.g. see FIG. 5). SBD return path 41, 35, 25 can be used with various embodiments of the invention as contrasted with using a slow, unreliable, and problematic TCP/IP return path 51, 53, 55, 57, 59, 45, 39, 27.

Referring to FIG. 1, mobile team 5, 7, 9 EUTs 11, 13, 15 communicate SBD messages 17, 19, 21 to MSS node 23 which are relayed 25 in-constellation directly to mobile team leader's 35 EUT 29 within the same footprint of MSS node 23; or relayed 37 to another MSS node 41 and communicated 40 to mobile team leader's 35 EUT 29 within that node's 41 footprint, via SI 31 to portable computer 33. In-constellation message path is more direct than using PLI server 49 located at gateway 47, but does not guarantee delivery of SBD PLI messages 17, 19, 21 to the mobile team leader's 35 EUT 29. The MSS may not support in-constellation delivery method.

Figure 2:
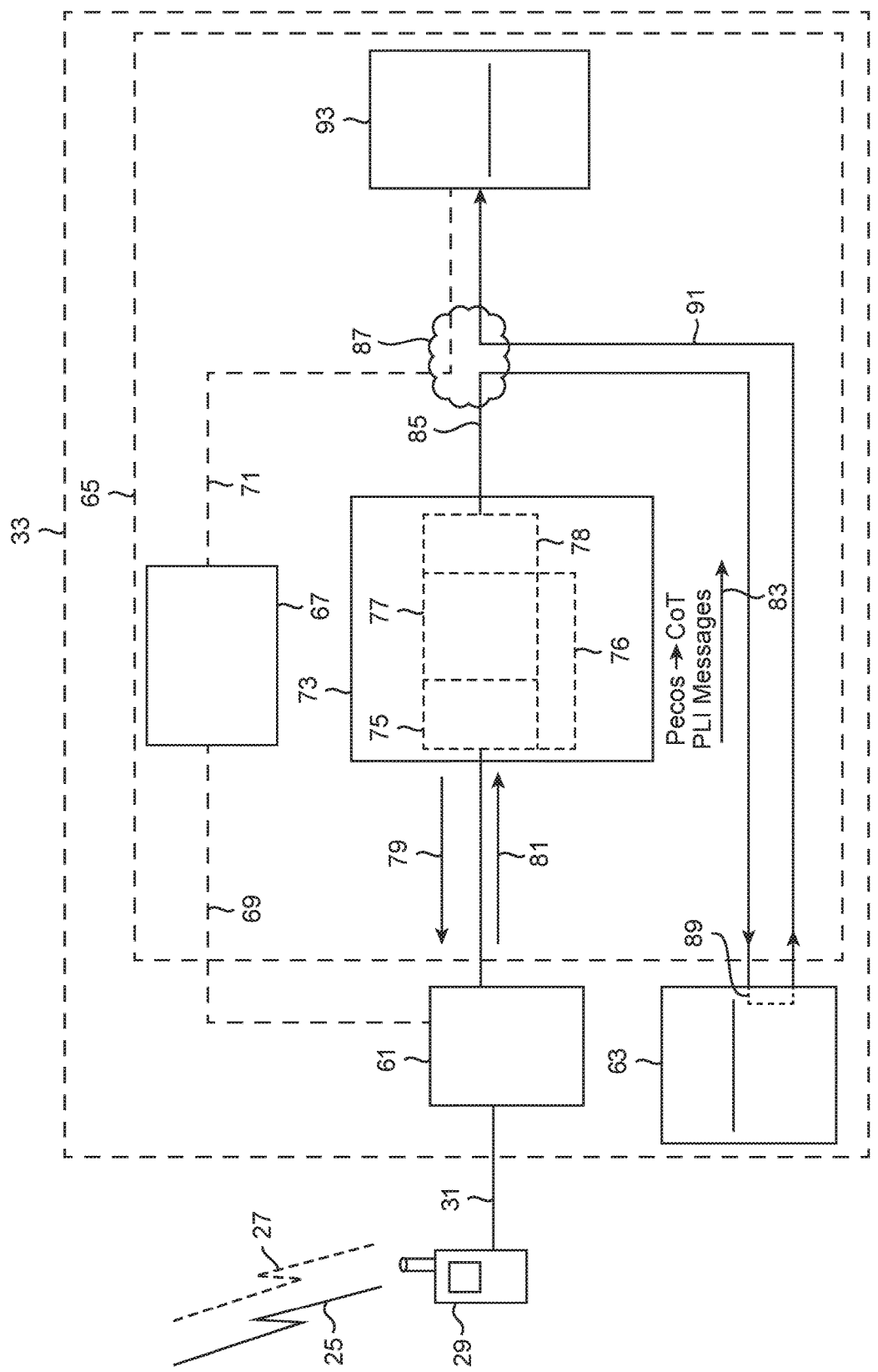
FIG. 2 illustrates an exemplary MTA signal or data flow diagram for interfacing MSS EUT system(s) to COP application program(s)

Referring to FIG. 2, MTA signal flow diagram is provided. Embodiments of the invention can use a messaging framework such as an XML-based information exchange specification and implementation profiles which provides a framework for sharing most commonly used data concepts of "what", "when", and "where" which can be an output from the MTA into the COP system. EUT 29 connects via SI 31 to a portable computer's 33 serial interface controller (SIC) 61 to operating system (OS) 65. MTA 73 controls EUT 29 with EUT control commands 79 and receives SBD PLI messages 81 over SI 31, 61. MTA 73 includes an interface control program (ICP) 75, decryptor 76 and message decoder (MD) 77. ICP 75 reads SBD PLI messages 81 from EUT 29 over SI 31, 61 by polling EUT 29 and forwards EUT PLI messages 81 optionally to decryptor 76 then to MD 77 within MTA 73. MD 77 converts SBD PLI messages 81 into a CoT PLI format 83 needed by COP application program 93.

MTA 73 and COP 93 application programs connect using sockets 85, 91 through TCP/IP stack 87 provided by OS 65 using an internal computer network interface 63 loopback network address 89. MTA 73 socket interface 78 sends translated PLI messages 83 via socket 85 to OS's 65 TCP/IP local loopback address 89. COP application program 93 connects to local loopback address 89 via socket 91 through stack 87 and receives translated CoT XML PLI 83 messages from MTA 73. COP application program 93 displays EUT 11, 13, 15 locations expressed by SBD PLI messages 17, 19, 21, 25, 37, 43, 81, 83.

Referring to FIG. 1, a PLI TCP/IP return communication path is shown for comparison (illustrated with dashed lines). SBD PLI messages stored in PLI server 49 are retrieved by PLI to CoT translator 53 from PLI server 49 via TCP/IP connection 51. CoT PLI messages 54 are communicated by TCP/IP connection 55 via Internet 57 to MSS gateway 47 and forwarded 45, 39, 27 via MSS nodes 41, 23 to mobile team leader's 35 EUT 29 via SI 31 to portable computer 33.

Referring to FIG. 2, a PLI TCP/IP return communication path within portable computer 33 is shown for comparison (illustrated with dashed lines). CoT PLI messages communicated by TCP/IP 27 to EUT 29 are sent via SI 31, 61 to OS's 65 point-to-point protocol (PPP) serial driver 67 and streamed to TCP/IP socket 71 and sent via OS's 65 TCP/IP stack 87 to COP application program 93. COP application program 93 displays EUT 11, 13, 15 locations expressed by CoT PLI messages translated by external PLI to COT translator 53.

New SBD based PLI approaches relocate PLI to CoT translator 53 from MSS gateway 47 into portable computer 33. Portable computer's 33 MTA 73 MD 77 performs the same functions of MSS gateway's 47 PLI to CoT translator 53. Relocating the PLI to CoT translator from 53 to 77 and communicating mobile team's PLI via SBD 17, 19, 21, 25, 37, 43 through MSS 23, 41, 47 to mobile team leader's 35 EUT 29 and portable computer 33, eliminates MSS TCP/IP communication path 45, 39, 25 with resulting disadvantages.

Figure 3:
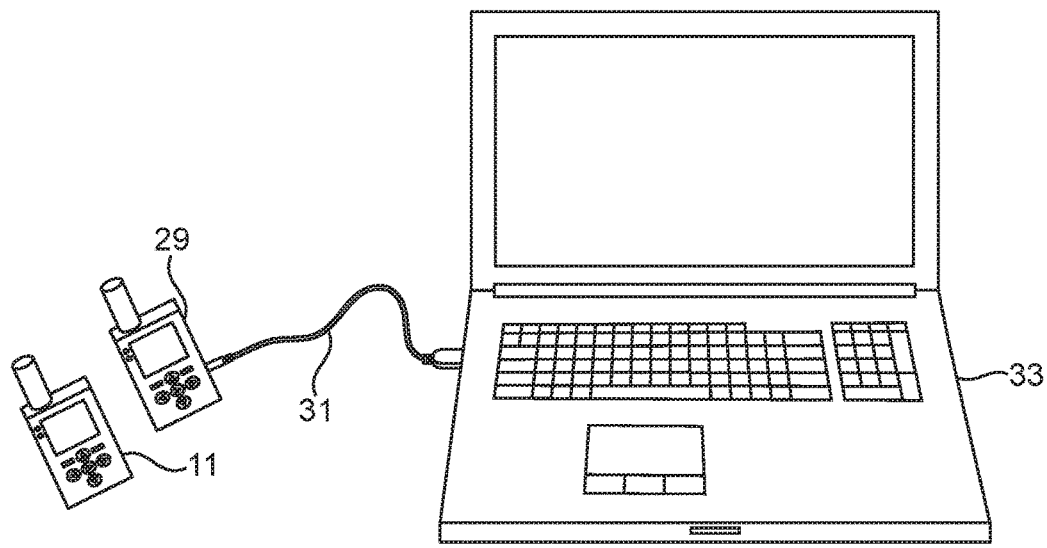
FIG. 3 shows exemplary NAL Research Corporation Shout Nano EUTs and a portable computer.

Referring to FIG. 3, pictures of NAL Research Shout Nano EUTs 11, 29 with portable computer 33 are provided. EUT 11 represents mobile team EUT (first EUT) and EUT 29 represents mobile team leader EUT (second EUT) which receives PLI information for display on COP application program 93. Mobile team leader EUT 29 is connected to portable computer 33 via SI 31. Elements are numbered to match corresponding items in FIG. 1 and FIG. 2.

Figure 4:
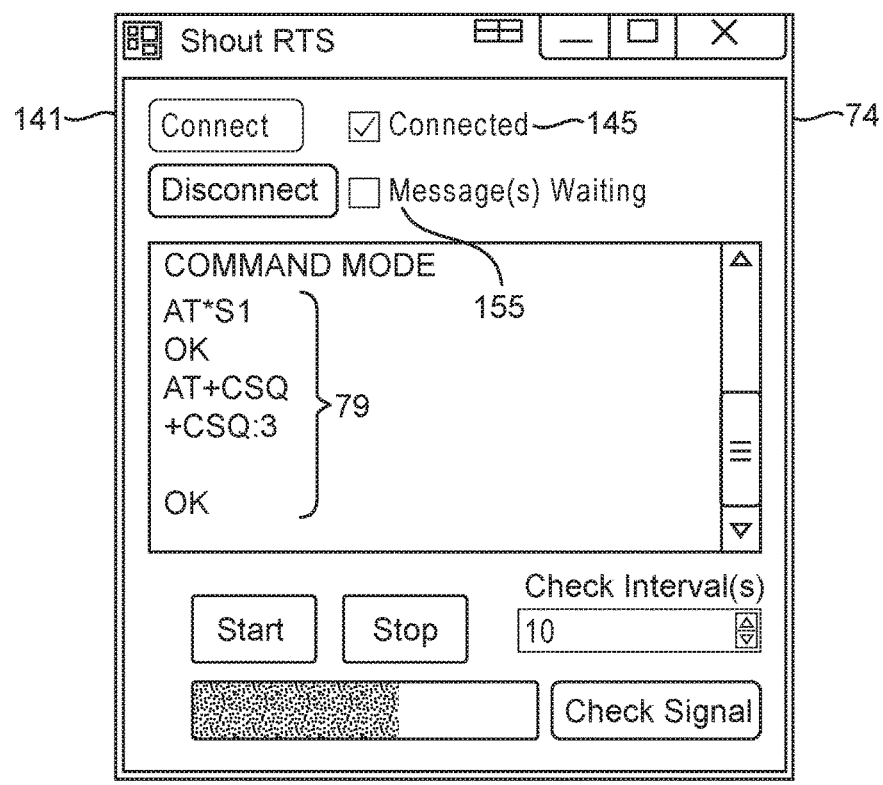
FIG. 4 shows an exemplary Shout RTS MTA graphical user interface (GUI) showing EUT "AT" commands and responses showing EUT "AT" commands and responses.

Referring to FIG. 4, screen snapshot of an exemplary communication/location device GUI 74, e.g., Shout RTS MTA 73 GUI 74 is provided. EUT control messages (e.g., Hayes commands) 79, 'Connect' button 141, connection status 145, and message(s) waiting 155 are identified and numbered to match corresponding items in FIG. 2, FIG. 8, and FIG. 9.

Figure 5:
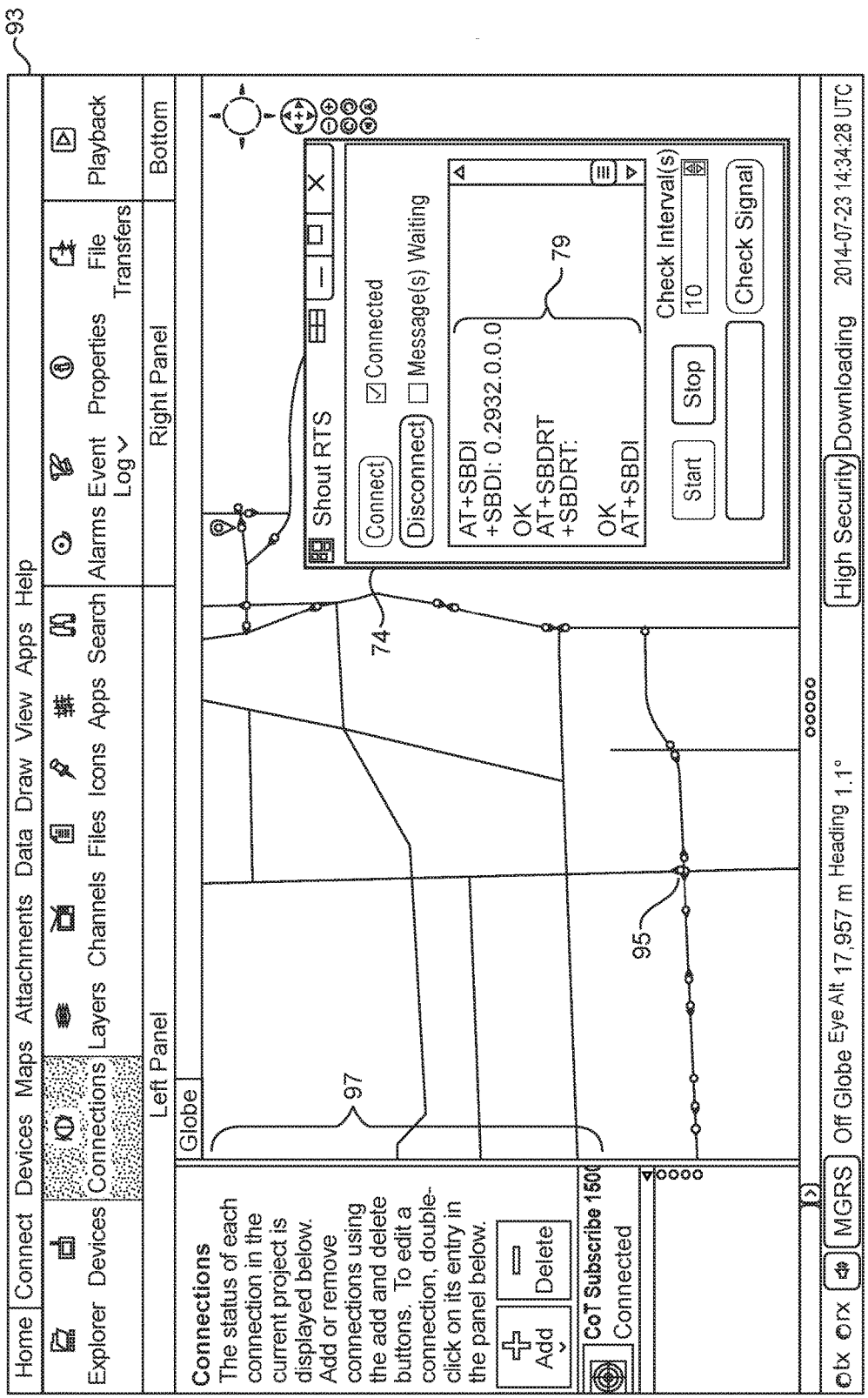
FIG. 5 shows an exemplary COP, e.g., RaptorX COP, display with EUT location tracks on a map, and Internet Protocol (IP) connections.

Referring to FIG. 5, an exemplary screen snapshot of an exemplary RaptorX COP display with PLI tracks is provided. Tracks are represented by symbols, e.g. dots, showing location. In the case of RaptorX, movement and direction is indicated by track symbols with arrows. In general, some embodiments of a COP can be a distributed set of common displays on different computers of information (e.g. position of entities (e.g. vehicles, people, structures, terrain, etc.) and position and status of important infrastructure such as bridges, roads, etc.) shared by more than one activities. A COP facilitates collaborative planning and assists all echelons to achieve (SA). RaptorX is one example of a COP including a three dimensional (3D) Geographic Information System (GIS) product with an extensive plug-in architecture for easy integration of disparate sensors, data services, imagery, elevation data, and more. The exemplary RaptorX program provides a single, extendible software platform to perform C2 for a wide array of sensors while retaining data fidelity for analysis and detailed visualization. A GIS component that is a part of RaptorX can be a NASA World Wind product. The NASA World Wind component renders up-to-date GIS information multiple times per second, allowing for immediate user feedback and awareness of changes, such as alerts, location updates, or other time-sensitive operations.

Exemplary RaptorX COP display 93 displays tracks 95 as green dots with red arrows. Exemplary RaptorX connections 97 subscribe to IP addresses and ports and must be configured to receive messages from MTA 73 through loopback address 89. Exemplary Shout RTS MTA GUI window 74 can be configured to overlap RaptorX display 93. EUT status messages 79 can be shown within MTA GUI window 74. COP display with tracks can be a final output of the exemplary SA and C2 interface system.

Figure 6:
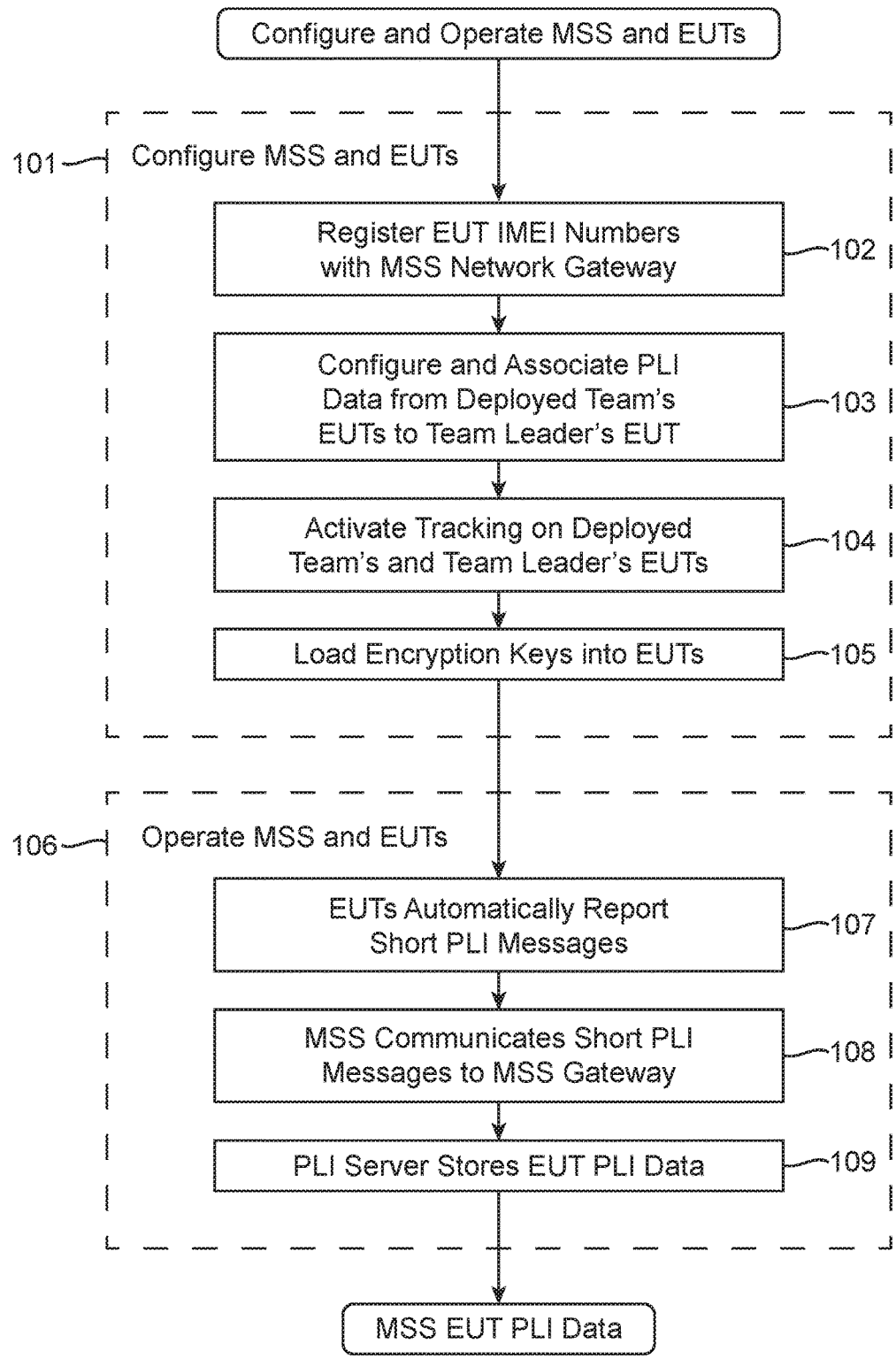
FIG. 6 is an exemplary MSS EUT registration and PLI configuration method to configure and operate MSS and EUTs to automatically report, communicate, and store PLI.

Referring to FIG. 6, an exemplary high level flow diagram to configure and operate exemplary MSS 23, 41, 47 and exemplary EUTs 11, 13, 15, 29 to report, communicate and store exemplary PLI through exemplary MSS C2 architecture (FIG. 1) is provided. These steps establish conditions to operate within larger MSS, C2 and SA context and environment. Step group 101 describes steps necessary to configure exemplary MSS 23, 41, 47 and exemplary EUTs 11, 13, 15, 29 to operate together to send exemplary PLI. Step 102 registers exemplary EUT 11, 13, 15, 29 International Mobile Equipment Identity (IMEI) numbers with exemplary MSS network 23, 41, 47. Step 103 configures exemplary MSS network 23, 41, 47 to associate exemplary deployed team 5, 7, 9 EUTs 11, 13, 15 exemplary SBD PLI messages 17, 19, 21 with team leader's 35 exemplary EUT 29 so that they can be retrieved by team leader's 35 exemplary EUT 29. Step 104 configures exemplary EUTs 11, 13, 15, 29 and activates exemplary EUTs 17, 19, 21, 29 tracking. Step 105 loads exemplary encryption keys into exemplary EUTs 11, 13, 15, 29 and must be performed for all exemplary EUTs 11, 13, 15 within a team, including mobile team leader's exemplary EUT 29.

Step group 106 operates exemplary EUTs 11, 13, 15, 29 within exemplary MSS 23, 41, 47 to send and store exemplary PLI. Step 107 automatically reports exemplary EUT's 11, 13, 15 positions, determined from exemplary MLS 1 (e.g. GPS) and exemplary GRS 3, using exemplary short PLI messages. Step 108 communicates exemplary short PLI messages through exemplary MSS 23, 41, 47 to exemplary PLI server 49. Step 109 stores exemplary PLI messages 17, 19, 21, 37, 43 on exemplary PLI server 49 for retrieval by mobile team leader's 35 exemplary EUT 29. Exemplary EUT 11, 13, 15 PLI messages 17, 19, 21, 37, 43 are "pushed" from exemplary EUT(s) 11, 13, 15 through exemplary MSS segments 23, 41, 47 to exemplary PLI server 49; PLI messages 43, 40, 37, 25 are also pulled from exemplary PLI server 49 through exemplary MSS segments 23, 41, 47 by mobile team leader's 35 exemplary EUT 29. In this embodiment, both "push" and "pull" architectures are present, creating a "store-and-forward" architecture wherein exemplary PLI is stored on exemplary PLI server 49.

Figure 7:
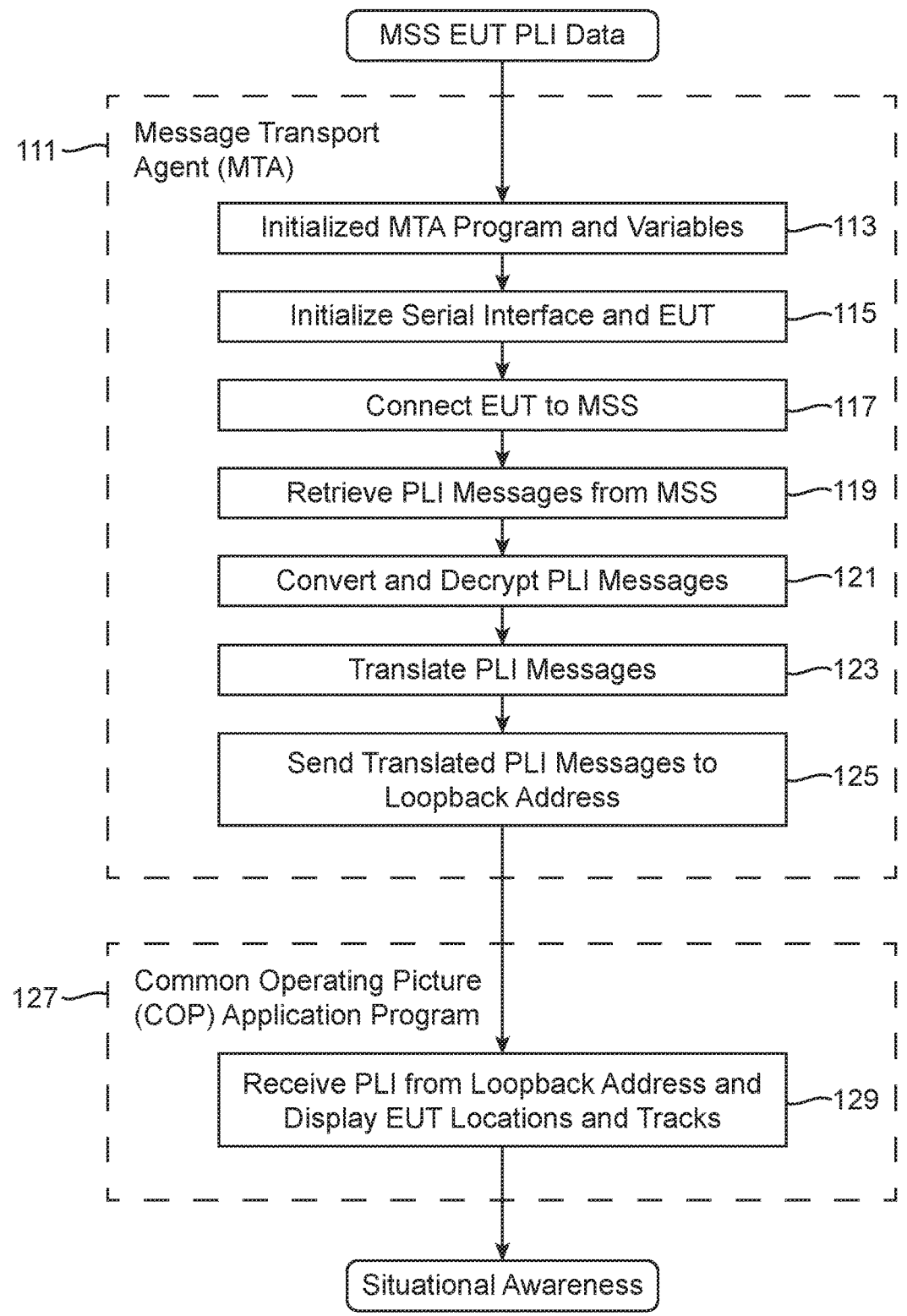
FIG. 7 is an exemplary high level flow diagram of MTA system process to retrieve, decrypt, convert, and send PLI to COP program for display.

Referring to FIG. 7, an exemplary high level flow diagram of an exemplary MTA 111 (FIG. 2 element 73) system operation is provided, configured for execution on applicable equipment. Exemplary MTA 111 "pulls" exemplary SBD PLI messages 81 from exemplary PLI server 49 through exemplary MSS 43, 40, 37, 25 and exemplary EUT 29; converts, decrypts and decodes exemplary small binary SBD PLI messages 81 into exemplary larger ASCII XML PLI messages 85; and sends exemplary decodes PLI messages 85 via exemplary computer's 33 exemplary internal TCP/IP loopback addresses 85, 87, 89, 91 to exemplary COP application program 93. Step 113 initializes exemplary MTA 111 program and variables. Steps 115, 117, 119 are performed by MTA 73 ICP 76. Step 115 initializes exemplary SI 31, 61 and exemplary EUT 29, further described by FIG. 8 steps 131, 133, 135, 137. Step 117 connects exemplary EUT 29 to exemplary MSS 23, 41, 47 further described by FIG. 8 steps 139, 141, 143, 145. Step 119 checks for and retrieves exemplary SBD PLI messages from exemplary PLI server 49 through exemplary MSS 23, 41, 47 and downloads exemplary SBD PLI messages 25, 37, 43 from exemplary EUT 29 through SI 31, described by FIG. 9 steps 151, 153, 155, 157, 159, 161. Step 121 is performed by MTA 73 decryptor 75. Step 121 converts and decrypts exemplary SBD PLI messages, described by FIG. 10 steps 171, 173, 175, 177, 179, 181, 183. Step 123 is performed by MTA 73 MD 77. Step 123 translates exemplary PLI messages from exemplary SBD format 81 (e.g. PECOS format) to exemplary COP application program 93 exemplary format 83, 85 (e.g. CoT XML), described by FIG. 11 steps 191, 193, 195, 197, 199, 201, 203, 205. Step 125 is performed by MTA 73. Step 125 sends exemplary translated PLI messages 83 to exemplary loopback address 89, shown by FIG. 2 elements 83, 85, 87, 89 and described by FIG. 12 steps 211, 213, 215, 217, 219, 221. Exemplary COP application program 127, shown by FIG. 2 element 93, described by step 129 and FIG. 12 steps 223, 225, 227 receives and displays exemplary EUT locations and exemplary PLI tracks to create SA. Exemplary MTA 111 retrieves exemplary SBD PLI messages 43, 40, 37, 25 from exemplary PLI server 49, without using TCP/IP protocol and XML through exemplary MSS 23, 41, 47; or modifying exemplary COP application program 93 to control exemplary EUT 29 and to read exemplary SBD PLI 81 messages. Exemplary MTA 111 eliminates sending exemplary larger ASCII XML PLI messages 54 through exemplary MSS 47, 41, 23 using TCP/IP protocol 45, 39, 25 improving throughput and reliability.

Figure 8:
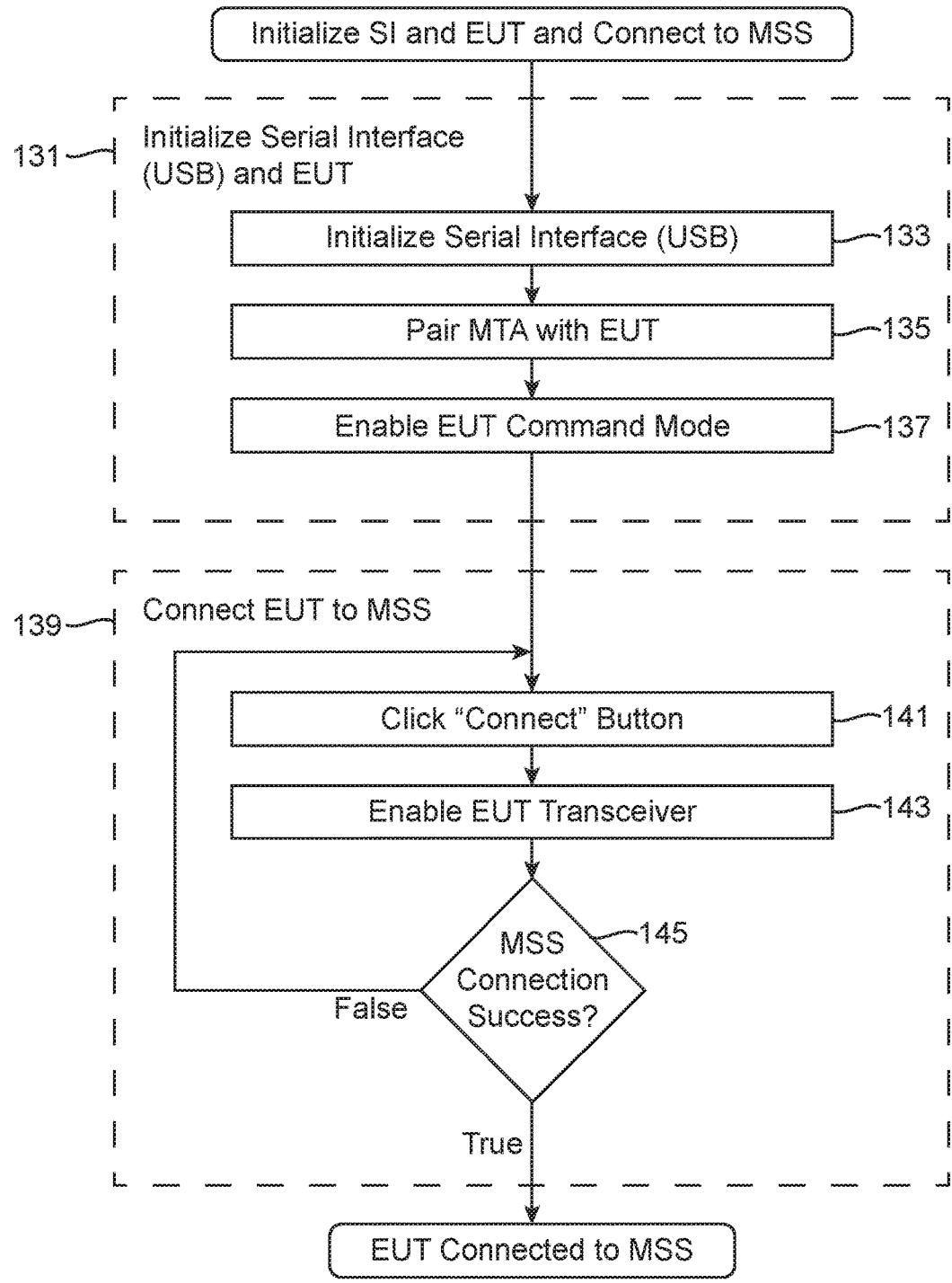
FIG. 8 is an exemplary MTA flow chart to initialize SI and EUT, and connect to MSS.

Referring to FIG. 8, an exemplary flowchart to initialize SI and EUT and connect with MSS is provided, configured for execution on applicable equipment. These steps are performed by FIG. 2 MTA 73 ICP 76. Step group 131 initializes SI 31, 61 and EUT 29 to connect mobile team leader's 35 exemplary computer 33 to exemplary EUT 29. Step 133, MTA's 73 ICP 75 initializes serial communications, e.g. USB, in computer's 33 SIC 61 over SI 31 to EUT 29. Step 135 pairs connected EUT 29 with MTA 73 so that MTA 73 can communicate with EUT 29. Step 137, MTA's 73 ICP 75 sends commands, e.g. Hayes "AT+++", and waits for response, e.g. "OK", to/from connected EUT 29 to establish and test serial data connection. These commands wake-up EUT 29 and prepares EUT 29 to receive additional commands and to send data to MTA 73. Step group 139 establishes connection from mobile team leader's EUT 29 with MSS 23, 41, 47. Step 141, connection between EUT 29 and MSS 23, 41, 47, is user 35 initiated by depressing a 'Connect' button, (FIG. 4, element 141) on MTA's 73 UI 74. Step 143 enables EUT's 29 transceiver and initiates handshaking between EUT 29 and MSS 23, 41, 47. EUT's 29 transceiver attempts to connect with MSS 23, 41, 47 and reports connection status 145. If connection is unsuccessful (false), the MTA 73 ICP 75 returns to step 141 to wait for user 35 to initiate EUT 29 connection to MSS 23, 41, 17 again. If MSS 23, 41, 47 connection is successful (true), MTA 73 ICP 75 proceeds to FIG. 9 to retrieve PLI messages from MSS.

Figure 9:
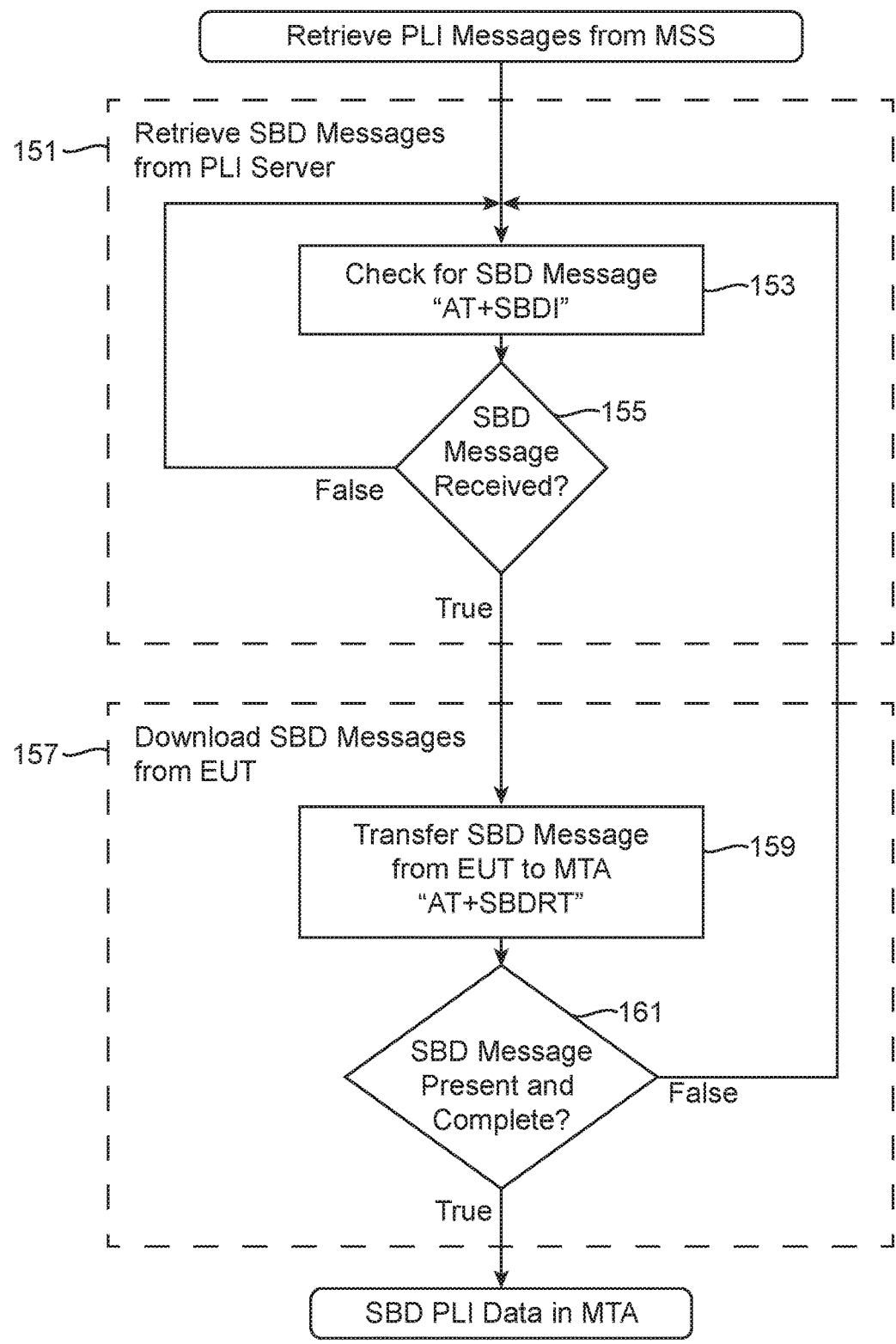
FIG. 9 is an exemplary MTA flow chart to retrieve PLI messages from MSS.

Referring to FIG. 9, an exemplary flowchart for retrieving PLI messages (e.g., PECOS PLI message, FIG. 14) from MSS is provided, configured for execution on applicable equipment. MTA's 73 ICP's 75 EUT 29 query cycle is performed continuously to retrieve PECOS PLI messages from PLI Server 49, a "pull" architecture, and to download messages into MTA 73. Two checks are performed: a) a quick check of PLI server 49 and retrieving message(s) from PLI server 49 through MSS 23, 41, 47 to EUT 29 using +SBDI command 153, 155 and b) a final data check after SBD message is retrieved from EUT 29 message buffer by MTA 73 using +SBDRT command 161. Step group 151 retrieves messages from PLI server 49. Step 153 AT command "+SBDI", Initiate a SBD Session, checks MSS 23, 41, 47 SBD PLI server 49 for messages and returns a command response "+SBDI:x,x,x,x,x,x". Step 155 tests third field, <MT status>, to identify whether a SBD message was received by EUT 29 and displays status on MTA's 73 UI (FIG. 4, elements 74 and 155). If SBD message is not received (false), the loop begins anew with "+SBDI" command step 153. If SBD message is received (true), MTA 73 proceeds to step group 157 to transfer PLI message 81 from EUT 29 to MTA 73 over SI 31, 61. Step 159 uses "+SBDRT" command, Read a Text Message, to transfer SBD message in hexadecimal format with response returned in format "+SBDRT:xxxxxxx . . . " where SBD message is appended to "+SBDRT:". Step 161 tests whether SBD message was received and complete. SBD messages can be concatenated over multiple bursts and this test insures complete message is received. Exemplary PECOS PLI messages (FIG. 14 elements 251, 253) are 36 bytes long and fit within one exemplary SBD 36 byte encrypted payload. If message is not present or incomplete (false), then step 161 returns to step 153 to begin PLI server 49 query cycle anew. If step 161 tests 'true', MTA 73 proceeds to FIG. 10 to convert and decrypt PLI messages.

Figure 10:
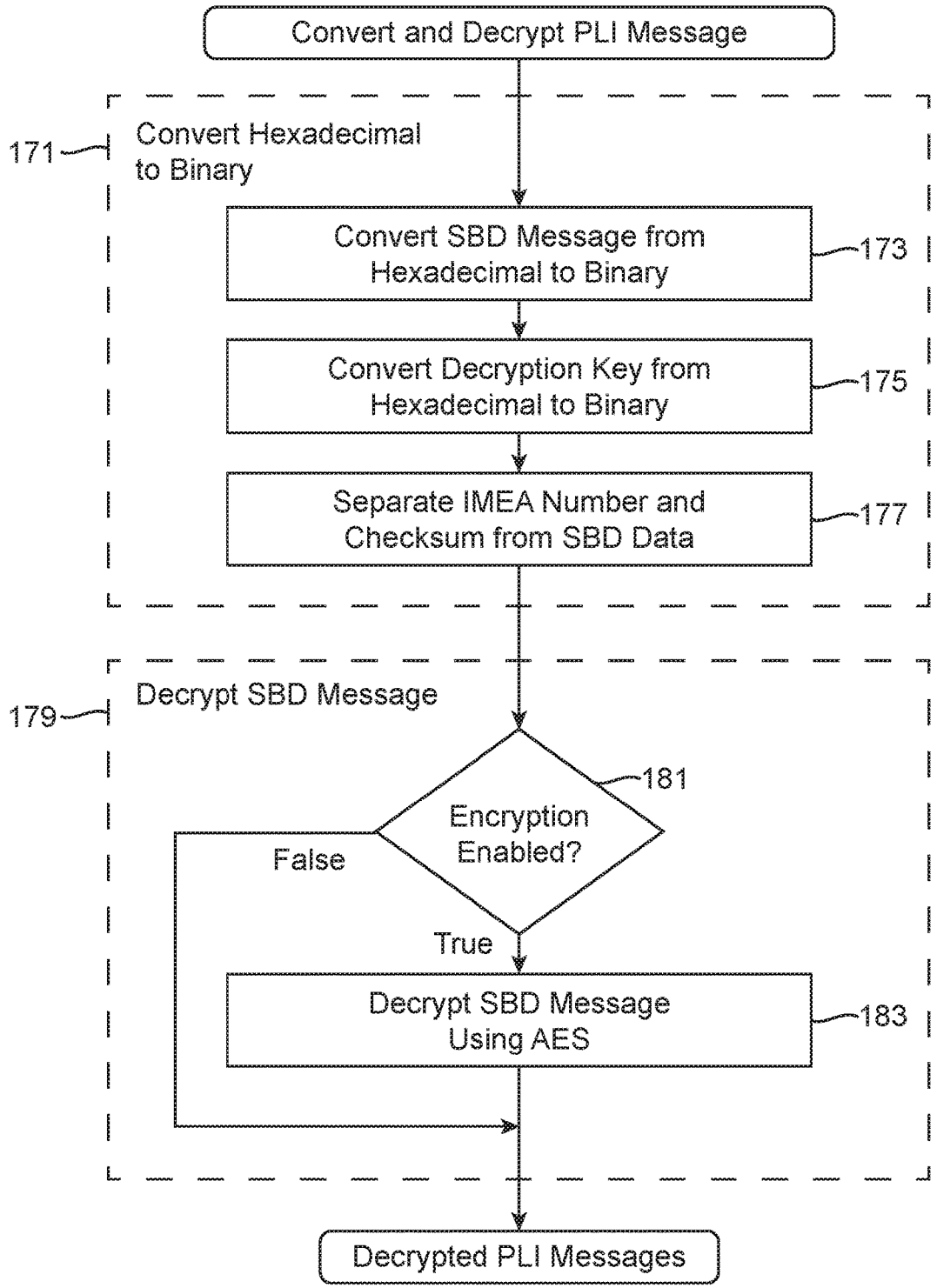
FIG. 10 is an exemplary MTA flow chart to convert and decrypt PLI messages from MSS.

Referring to FIG. 10, an exemplary flowchart to convert and decrypt PLI messages is provided, configured for execution on applicable equipment. These steps are performed by FIG. 2 MTA 73 decryptor 76. Step group 171 converts hexadecimal SBD messages and decryption keys into binary. Hexadecimal can represent binary using two hexadecimal characters with sixteen values ranging from 0-9 and A-F to represent one binary byte with 256 values. Hexadecimal is human readable and hexadecimal decryption keys can be entered via keyboard. Step 173 converts SBD message from hexadecimal to binary. Step 175 converts decryption key from hexadecimal to binary. Step 177 separates EUT 11, 13, 15 unencrypted IMEI number and checksum from SBD data. Step group 179 decrypts SBD message. Step 181 tests whether encryption is enabled. If 'false' it skips step 183 to decrypt SBD message. If 'true', step 183 decrypts SBD message using Advanced Encryption Standard (AES). MTA 73 proceeds to send decrypted data to FIG. 11 for translation from binary (e.g. PECOS) to XML (e.g. CoT) format.

Figure 11:
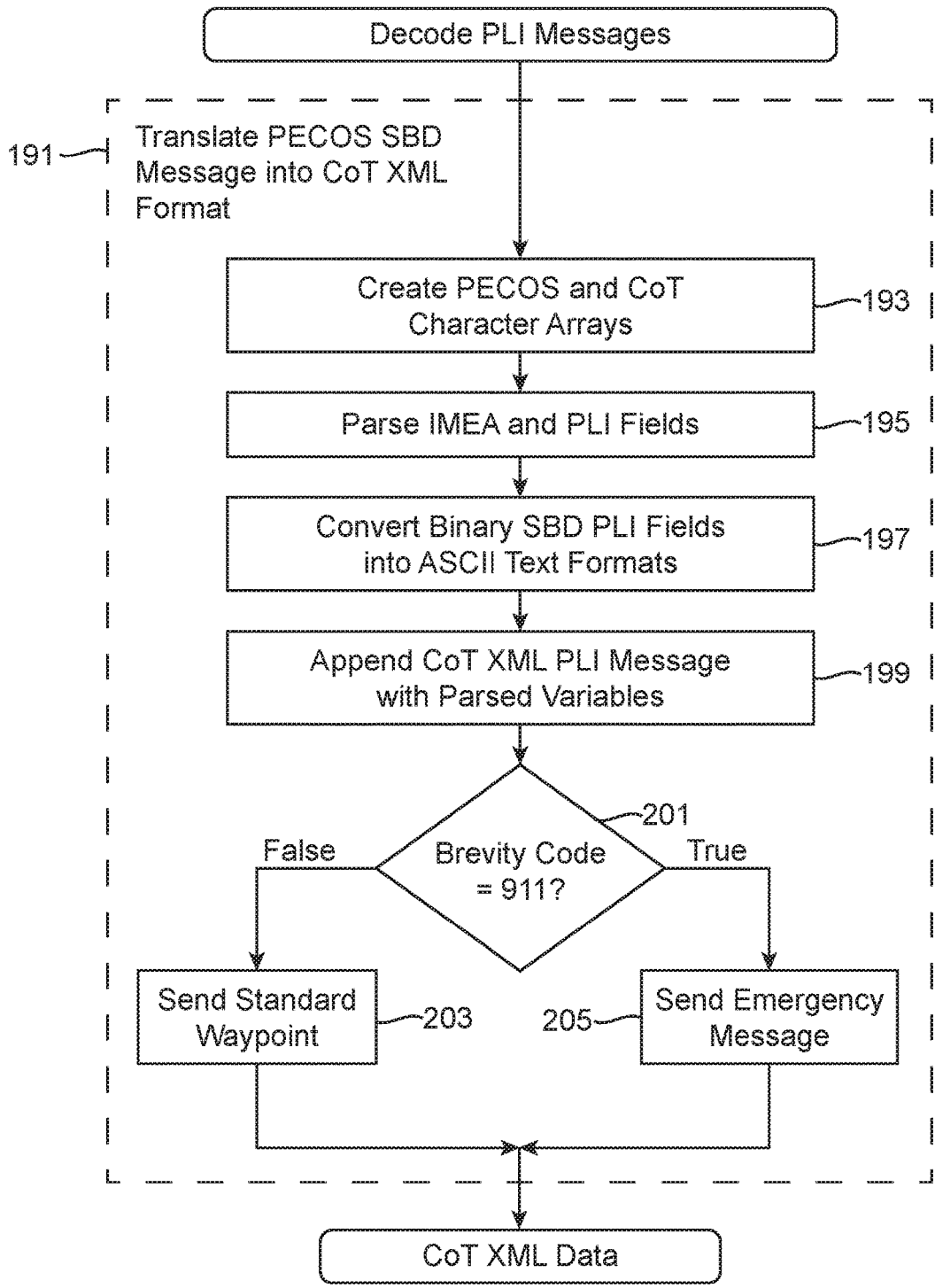
FIG. 11 is an exemplary MTA flow chart to decode PLI messages PECOS SBD message format to CoT XML message format.

Referring to FIG. 11, an exemplary flowchart to decode from PECOS SBD message format to CoT XMLmessage format, configured for execution on applicable equipment, is shown. These steps are performed by FIG. 2 MTA 73 MD 77. Step group 191 converts binary PECOS SBD PLI messages (FIG. 14) into ASCII CoT XML format (FIG. 15). Step 193 creates PECOS binary and ASCII character arrays, and CoT ASCII character array (FIG. 13) in computer's 33 Random Access Memory (RAM). Step 195 parses ASCII IMEI number and binary PLI fields. Step 197 converts binary PECOS SBD PLI data fields (FIG. 14), e.g., time, brevity code, position dilution of precision (PDOP), latitude, longitude, altitude, course, and ground velocity, into ASCII formats. Step 199 appends ASCII PLI data (FIG. 14 element 253) into CoT XML message format (FIG. 15). Step 201 tests for brevity code "911", and if 'false' step 203 sends converted standard CoT XML waypoint. If brevity code is "911" (true) then step 205 sends appropriate EM.

Figure 12:
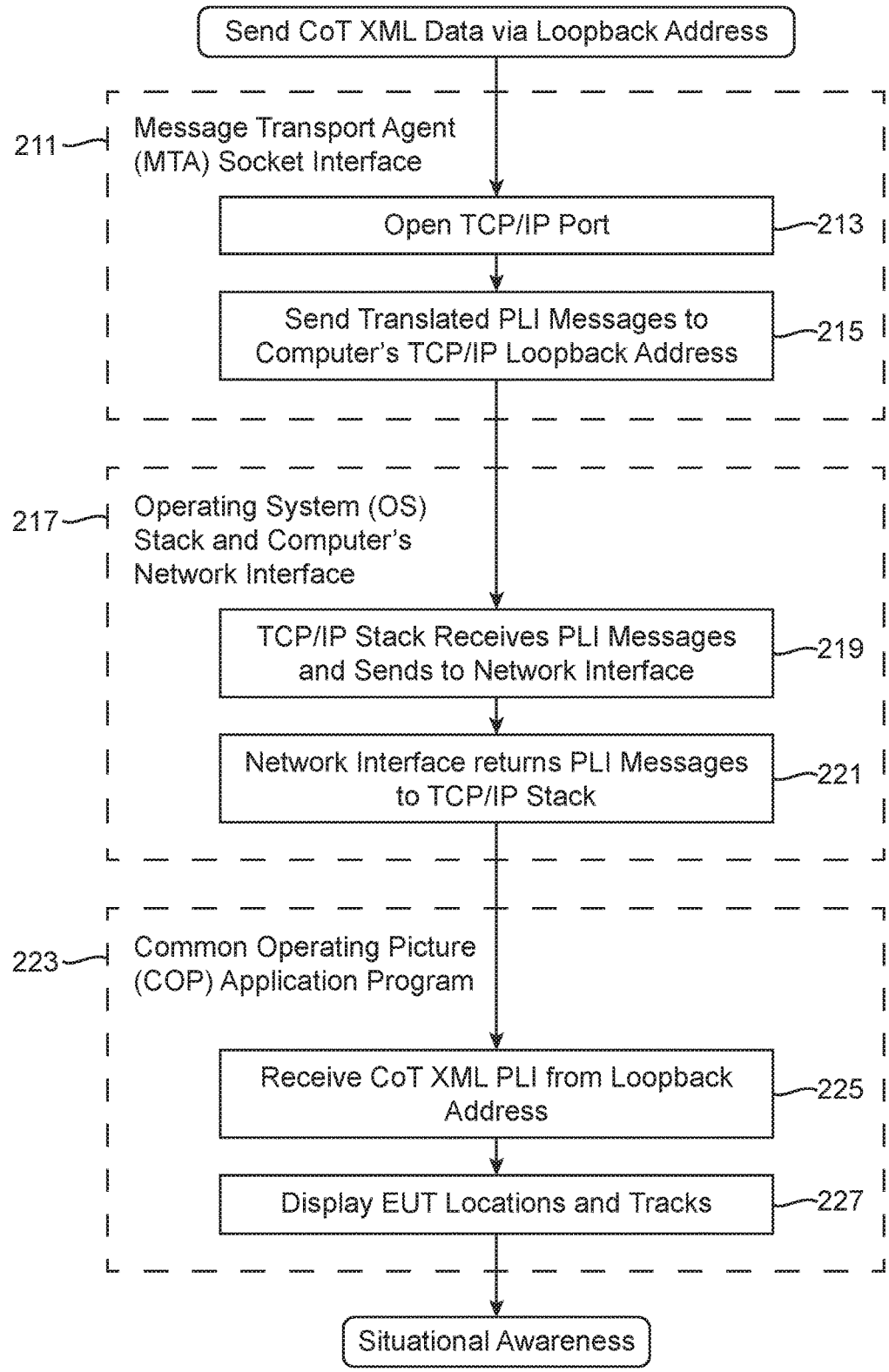
FIG. 12 is an exemplary flow chart to send CoT XML data via computer's TCP/IP loopback address between MTA and COP.

Referring to FIG. 12, an exemplary flowchart to send CoT XML data via computer's TCP/IP loopback address between MTA and COP, configured for execution on applicable equipment, is shown. These steps are performed by FIG. 2 MTA's 73 socket interface 78, OS's 65 TCP/IP stack 87, computer's 33 network interface 63 loopback address 89, and COP application program 93. In step group 211, MTA 73 socket interface 78 sends translated PLI CoT XML messages 85 to computer's 33 loopback address 87. Step 213 opens internet protocol (IP) port (e.g. 1500) with TCP/IP stack 87. Step 215 sends translated CoT XML PLI messages 83 to OS's 65 TCP/IP stack 87. In step group 217, OS's 65 and computer's 33 network interface 63 routes PLI messages from MTA 73 to COP application program 93. Step 219 OS's TCP/P stack receives CoT XML PLI messages and routes to network interface's 63 loopback address 89 (e.g. 127.0.0.1). Step 221 network interface 63 loopback address 89 returns CoT XML PLI data to TCP/IP stack 87. In step group 223, COP application program 93 receives and displays PLI. Step 225 subscribes to and receives CoT XML PLI 83 from TCP/IP stack 89. Step 227 COP application program 93 displays EUT 11, 13, 15 locations and tracks 95 expressed by translated CoT XML PLI messages 83.

Figure 13:
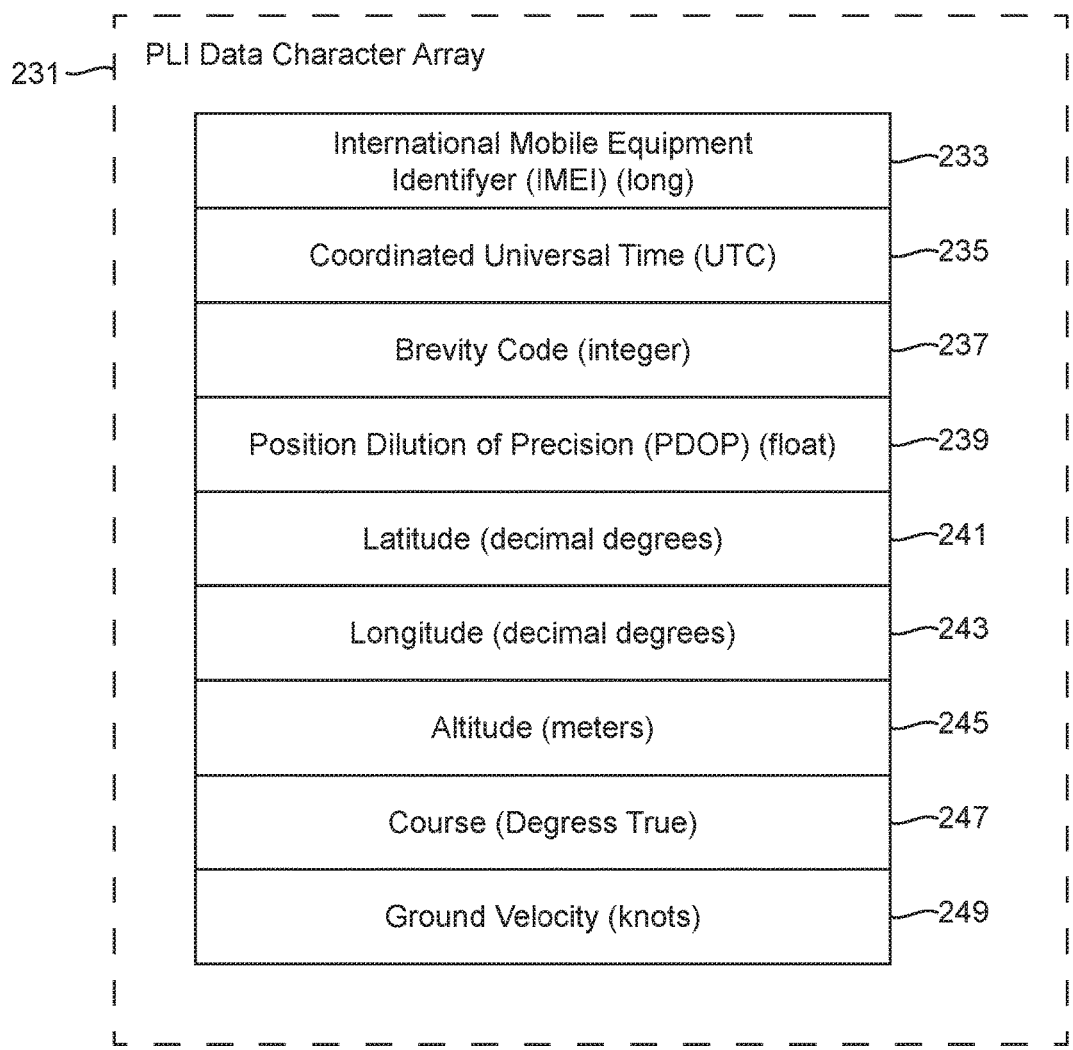
FIG. 13 is an exemplary PLI data character array with PECOS PLI data fields.

Referring to FIG. 13, an exemplary PLI data character array 231 is shown. PLI character array is created by MTA 73 MD 77 (FIG. 11 step 193) with: a) PECOS binary, b) PECOS ASCII, and c) CoT ASCII character arrays in computer's 33 Random Access Memory (RAM). PECOS PLI binary character array includes: Coordinated Universal Time (UTC) 235, brevity code 237, position dilution of precision (PDOP) 239, latitude 241, longitude 243, altitude 245, course 247, and ground velocity 249. PECOS ASCII character array adds IMEI number 233 in addition to PLI fields. CoT ASCII array is a long string with multiple lines separated by carriage return <CR> line feeds <LF> 255. PECOS PLI binary array receives parsed PECOS SBD PLI message from FIG. 11 step 195. PECOS PLI ASCII array receives converted SBD PLI fields, in addition to parsed ASCII IMEI field from FIG. 11 step 197. CoT ASCII array receives XML tags and ASCII fields from PECOS PLI ASCII array 231 to construct a CoT PLI message 255.

Referring to FIG. 14, an exemplary PECOS PLI message in hexadecimal short position format 251 is shown. PECOS PLI message 251 format includes binary data (e.g. integer, float, double) fields 253 concatenated without delimiters (e.g. ',' comma) to minimize size. PECOS PLI message fields 253 include: Coordinated Universal Time (UTC), brevity code, position dilution of precision (PDOP), latitude, longitude, altitude, course, and ground velocity. PECOS PLI message format is translated by MTA 73 MD 77 into CoT XML format (FIG. 15 255).

Referring to FIG. 15, an exemplary CoT XML PLI Message 255 is shown. Exemplar CoT XML PLI message 255 includes "what" (e.g. EUT IMEI number, user identification, UID, FIG. 15 element 255, "uid="), "where" (e.g. latitude, longitude, and elevation), and "when" (e.g. time, start, and stale). This exemplary CoT PLI message also includes: course over ground (degrees true) and speed over ground (knots) mapped to CoT track course and speed fields. Position dilution of precision (PDOP) and brevity codes from PECOS PLI message are also mapped to CoT "pdop" and "brevity" fields. PDOP identifies GPS precision in meters and brevity identifies "short" and "long" position formats, and "911" EM. Short format fits into one encrypted SBD payload (36 bytes) and long format fits into one unencrypted SBD payload (51 bytes). This exemplary CoT XML PLI message 255 can be output from MTA 73 and read by COP application program 93 for SA display 95 with mobile team's 5, 7, 9 EUT 17, 19, 21 positions and tracks on mobile team leader's 35 portable computer 33.

Referring to FIG. 16, a software function call list, configured for execution on applicable equipment, is shown for an exemplary embodiment of MTA 73. Exemplary Subroutine 301 Main_Form_Open, FIG. 7 step 113, starts MTA program 73 and initializes MTA program 73 and variables.

Exemplary subroutine 303 NAL_USB_Connect, FIG. 8 step group 131, configured for execution on applicable equipment, initializes SI 31 between mobile team leader's EUT 29 and computer 33 through operating system (OS) 65 to SIC 61, pairs MTA 73 with EUT 29, and enables EUT 29 command mode using FIG. 8 steps 131, 133, 135, 137.

Exemplary Subroutine 305 Connect_Button_Click, FIG. 8 step group 139, configured for execution on applicable equipment, connects EUT 29 to MSS 24, 41, 47 using FIG. 8 steps 139, 141, 143, 145. Upon "Connect" button clicked, commands are sent to EUT 29 to enable EUT's transceiver 143 to connect to MSS 23, 41 and test and display connection success (FIG. 4 element 145).

Exemplary Subroutine 307 SBDI_Send, FIG. 9 step group 151, configured for execution on applicable equipment, polls MSS PLI server 49 for messages and retrieves messages using FIG. 9 steps 151, 153, 155 to read SBD PLI messages 17, 19, 21, 37, 43 from MSS's 23, 41, 47 PLI Server 49.

Exemplary subroutine 309 SBDRT_Send_EUT, FIG. 9 step group 157, configured for execution on applicable equipment, downloads SBD PLI messages 81 from EUT 29 to MTA 73 and tests for message present and completeness. If message is not received (FIG. 9, step 155) or not present or complete (FIG. 9 step 161), subroutine 309 returns to subroutine 307 to continue polling for messages. If message is received (FIG. 9 step 161) the message is forwarded to subroutine 311 Convert_Hex_to_Binary.

Exemplary Subroutine 311 Convert_Hex_to_Binary, FIG. 10 step group 171, configured for execution on applicable equipment, converts SBD messages 173 and decryption key 175 from hexadecimal (hex) to binary. Unencrypted IMEI number (FIG. 6 element 102) and checksum are separated from encrypted data before decryption 177. IMEI number is later appended to CoT message (FIG. 15 element 255, "uid=").

Exemplary Subroutine 313 Decrypt AES, FIG. 10 step group 179, configured for execution on applicable equipment, decrypts SBD data 173 using AES algorithm 183 with decryption key 175. Decrypted data 183 is forwarded to subroutine 315 Decode_SBD_to_CoT.

Exemplary Subroutine 315 Decode_SBD_to_CoT, FIG. 11 step group 191, configured for execution on applicable equipment, converts SBD PLI text (FIG. 2 element 81) in PECOS format, FIG. 14, into CoT PLI message (FIG. 2 element 83) XML format, FIG. 17. If brevity code is "911" step 201, an EM is sent 205, otherwise a standard waypoint 203 is forwarded to subroutine 317 Send_to_Loopback_Address.

Exemplary Subroutine 317 Send_to_Loopback_Address, FIG. 12 step group 211, configured for execution on applicable equipment, sends translated PLI messages 83, 85 to computer's 33 TCP/IP stack 87 and loopback address 89 for COP application program 93. After sending CoT message, polling for SBD messages 17, 19, 21, 37, 43, 49 from MSS 23, 41, 49 starts over, FIG. 9.

Although the invention has been described in detail with reference to certain preferred embodiments, variations and modifications exist within the spirit and scope of the invention as described and defined in the following claims.

The invention claimed is:

1. A system for providing situational awareness (SA) and communication between entities comprising:

a global positioning system (GPS) satellite system comprising a plurality of satellites configured for transmitting a plurality of position location signals to a plurality of end user terminals (EUTs) comprising position location identification (PLI) sections, said EUTs comprising a first and second plurality of EUTs;

a mobile satellite system (MSS) comprising a plurality of satellites configured to transmit and receive a plurality of data including short burst data (SBD) first format messages to and from said EUTs comprising MSS communication sections;

a first plurality of EUTs each configured to store at least one unique EUT identifier data section comprising at least one identifier data associated each said first EUT, each said first EUT comprising a GPS receiver wherein said GPS receiver receives said plurality of GPS position location signals and determines location from said GPS satellite system, each said first EUT configured to assemble short PLI SBD first format messages with said EUT identifier data and said position location signals, and each said first EUT comprising a MSS transceiver configured to communicate with said MSS to send said SBD first format messages, wherein each said first EUT transmits said SBD PLI data to said MSS;

a first plurality of said SBD first format messages each comprising a plurality of payload or packet of a predefined number of characters, said SBD first format messages each comprising one PLI data comprising a unique EUT identifier and a geospatial reference position data;

a PLI server in communication with said MSS configured to receive said first EUT transmitted said PLI data communicated through said MSS, wherein said PLI data is configured to be retrieved from said PLI server through said MSS by a second EUT using said SBD first format messages;

at least one said second EUT comprising a second said MSS transceiver configured to retrieve said PLI data from said PLI server in said SBD first format, said at least one second EUT further comprising a serial interface (SI) to control said second EUT and to communicate said PLI data from said second EUT's said second MSS transceiver to at least one computer;

at least one said computer coupled with said second EUT through SI comprising a data storage section, a processor, an input/output system, and a display, said computer further configured to store and to execute a plurality of non-transitory machine readable instructions stored on said data storage section and configured to be read and executed by said processor, said plurality of non-transitory machine readable instructions comprising a message transport agent (MTA) program and a common operating picture (COP) application program;

a MTA program comprising a plurality of input and output (IO) systems configured to communicate with said second EUT comprising a SI, control said second EUT to retrieve said plurality of SBD first format messages from said PLI server, download said plurality of SBD first format messages from said second EUT to MTA, decode said plurality of said SBD first format messages into a plurality of second format messages comprising extensible markup language (XML), and communicate said converted second format messages between MTA and COP application programs using an internal TCP/IP socket communication process within said computer;

a TCP/IP communication stack within said computer which receives and sends TCP/IP socket communication between MTA and COP application programs and computer network interface; and a COP application program configured to receive said plurality of XML second format messages from said TCP/IP stack and to display a map and a plurality of graphical user elements displayed on said map comprising said PLI data based on said plurality of XML second format messages;

wherein plurality of said PLI data communicated by said MSS to said at least one computer is displayed by said COP application program for said SA.

2. The system of claim 1, wherein said GPS satellite system is configured to determine said geospatial reference position of said first EUTs;

wherein said MSS further comprises a section configured for operating above at least said first plurality of EUTs and ground segments comprising said plurality of EUTs configured to transmit and receive a plurality of said data or messages from said plurality of EUTs to a MSS gateway, and from said MSS gateway to said plurality of EUTs using said SBD format messages;

wherein at least one said computer comprising said MTA controls each said second EUT using an interface control program (ICP) to connect to MSS, retrieve PLI data from MSS PLI server, receive said PLI data from said each said second EUT, and check for data errors;

wherein said MTA's decryptor optionally decrypts retrieved PLI messages using Advanced Encryption Standard (AES) and forwards to MTA's message decoder (MD);

wherein said MD converts and expands said short message format PLI messages from a binary PECOS message format to an ASCII extensible markup language (XML) Cursor on Target (CoT) message format machine readable data stored on machine readable storage media;

wherein said MTA's socket interface program communicates said converted CoT XML messages to said COP application program using an internal TCP/IP socket communication process within said computer via said computer's TCP/IP stack via internal computer network interface loopback address;

wherein said COP application program generates said map with a plurality of entities on said map associated with said identifiers and said position location data.

3. The system of claim 1, wherein at least some of said plurality of said PLI data is communicated within said MSS space segment directly between one or more of said plurality of said first EUTs to at least one said second EUT so that said MSS gateway and said PLI server are bypassed, wherein said MSS space segment communication of at least some of said plurality of PLI data between one or more of said plurality of said first EUTs and at least one said second EUT is within said MSS space segment.

4. The system of claim 3, wherein said MSS space segment communication of a plurality of said PLI data between a plurality of said EUTs is relayed between a plurality of said space segment nodes.

5. The system of claim 1 wherein SBD first format message "911" brevity code generates third format emergency message (EM) in said XML format and communicated within said computer between said MTA and said COP application program using said computer's said internal TCP/IP socket communication process.

6. A system for providing situational awareness (SA) and communication between entities comprising:
- a global positioning system (GPS) satellite system configured to transmit a plurality of timing signals used in position location determination by a GPS ground system used in part to determine each said geospatial reference position;
- a mobile satellite system (MSS) comprising a plurality of satellites configured to transmit and receive a plurality of data including short burst data (SBD) first format messages to and from a plurality of end user terminals (EUTs) comprising a first and second plurality of first EUTs, said MSS comprising MSS communication sections;
- said first plurality of first EUTs each configured to store at least one unique EUT identifier data comprising at least one identifier data associated each said first EUT, each said first EUT comprising a GPS receiver wherein said GPS receiver receives said plurality of GPS position location signals and determines position location from said GPS satellite system, each of said first EUT configured to assemble short PLI SBD first format messages with said EUT identifier and said position data, and each said first EUT comprising MSS transceiver configured to communicate with said MSS to send said SBD first format messages, wherein each said first EUT transmits said SBD PLI data to said MSS;
- a first plurality of said SBD first format messages each comprising a plurality of payload or packet of a predefined number of characters, said SBD first format messages each comprising one PLI data comprising a unique EUT identifier and a geospatial reference position data;
- a PLI server in communication with said MSS configured to receive said first EUT transmitted PLI data communicated through said MSS, wherein said PLI data is configured to be retrieved from said PLI server through said MSS by each said second EUT using said SBD first format messages;
- said second plurality of EUTs comprising at least one said second EUT comprising a second MSS transceiver configured to retrieve said PLI data from said PLI server in said SBD first format messages, said at least one second EUT further comprising serial interface (SI) to control said second EUT and to communicate said PLI data from said second EUT's second MSS transceiver to at least one computer;
- at least one said computer coupled with said second EUT through SI comprising a data storage section, a processor, an input/output system, and a display, said computer further configured to store and to execute a plurality of non-transitory machine readable instructions stored on said data storage section and configured to be read and executed by said processor, said plurality of non-transitory machine readable instructions comprising a message transport agent (MTA) program and a common operating picture (COP) application program;
- a MTA program comprising a plurality of input and output (IO) systems configured to communicate with said second EUT comprising a SI, control said second EUT to retrieve said plurality of SBD first format messages from said PLI server, download said plurality of SBD first format messages from said second EUT to MTA, decode said plurality of said SBD first format messages into a plurality of second format messages comprising extensible markup language (XML), and communicate said converted second format messages between MTA and COP application programs using an internal TCP/IP socket communication process within said computer;
- a TCP/IP communication stack within said computer which receives and sends TCP/IP socket communication between MTA and COP application programs and computer network interface; and
- a COP application program configured to receive said plurality of XML second format messages from said TCP/IP stack and to display a map and a plurality of graphical user elements displayed on said map comprising said PLI data based on said plurality of XML second format messages;
- wherein plurality of said PLI data communicated by said MSS to said computer is displayed by said COP application program for said SA;
- wherein said MTA's decryptor optionally decrypts retrieved PLI messages using Advanced Encryption Standard (AES) and forwards to MTA's message decoder (MD);
- wherein said MD converts and expands said short message format PLI messages from a binary PECOS message format to a ASCII extensible markup language (XML) Cursor on Target (CoT) message format;
- wherein said MTA's socket interface program communicates said converted CoT XML messages to said COP application program via said computer's said TCP/IP stack via said internal network interface loopback address;
- wherein said SBD first format message comprises a first brevity code that is configured to generate a third format emergency message (EM) in said XML format and communicated within said computer between said MTA and said COP application program using said computer's said computer's said internal TCP/IP socket communication process;
- wherein at least some of said plurality of said PLI data is communicated within said MSS space segment directly between one or more of said plurality of said first EUTs and at least one second EUT so that said MSS gateway and said PLI server are bypassed, wherein said MSS space segment communication of at least some of said plurality of PLI data between one or more of said plurality of said first EUTs is within said MSS space segment;
- wherein said MSS space segment communication of plurality of said PLI data between plurality of said EUTs is relayed between a plurality said space segment nodes.

* * * * *